United States Patent
Grzesiak (10) Patent No.: US 8,824,732 B2
(45) Date of Patent: Sep. 2, 2014

(54) APPARATUS AND METHOD FOR RECOGNIZING HAND ROTATION

(75) Inventor: Grzegorz Pawel Grzesiak, Warsaw (PL)

(73) Assignee: Samsung Electronics Co., Ltd (KR)

( * ) Notice: Subject to any disclaimer, the term of this patent is extended or adjusted under 35 U.S.C. 154(b) by 268 days.

(21) Appl. No.: 13/357,092

(22) Filed: Jan. 24, 2012

(65) Prior Publication Data

US 2012/0189163 A1    Jul. 26, 2012

(30) Foreign Application Priority Data

Jan. 24, 2011    (KR) .................. 10-2011-0006888

(51) Int. Cl.
*G06K 9/00*    (2006.01)

(52) U.S. Cl.
USPC ........................................ 382/103

(58) Field of Classification Search
CPC .................................... G06K 9/6205
See application file for complete search history.

(56) References Cited

U.S. PATENT DOCUMENTS

| | | | |
|---|---|---|---|
| 5,454,043 A | | 9/1995 | Freeman |
| 5,548,667 A | * | 8/1996 | Tu .................................. 382/285 |
| 6,002,828 A | | 12/1999 | Hult et al. |
| 6,624,833 B1 | | 9/2003 | Kumar et al. |
| 6,788,809 B1 | | 9/2004 | Grzeszczuk et al. |
| 6,819,782 B1 | * | 11/2004 | Imagawa et al. .............. 382/115 |

FOREIGN PATENT DOCUMENTS

JP    2001-188897    7/2001

OTHER PUBLICATIONS

Kierkegaard, "A Method for Detection of Circular Arcs Based on the Hough Transform", Machine Vision and Applications, 1992, pp. 249-263).*
Jaroslav Borovicka, "Circle Detection Using Hough Transforms Documentation", COMS30121—Image Processing and Computer Vision, 2003.
A.S. Aguado et al., "A New Hough Transform Mapping for Ellipse Detection", 1995/6 Research Journal, Image, Speech and Intelligent Systems, Jun. 1996.
J. Illingworth et al., "The Adaptive Hough Transform", IEEE Transactions on Pattern Analysis and Machine Intelligence, vol. Pami-9, No. 5, Sep. 1987.
Mike D, "Apple's Tablet to Have 3D Navigation System", Jan. 5, 2010.
YingLiang Ma et al., "Using B-Spline Curves for Hand Recognition", Proceedings of the 17th International Conference on Pattern Recognition (ICPR'04), Aug. 23, 2004.
Tina Yu Tian et al., "Recovering 3D Motion of Multiple Objects Using Adaptive Hough Transform", Oct. 1997.
Koichi Ishibuchi et al., "Real Time Hand Shape Recognition Using Pipe-line Image Processor", IEEE International Workship on Robot and Human Communication, Sep. 1, 1992.

* cited by examiner

*Primary Examiner* — Amara Abdi
(74) *Attorney, Agent, or Firm* — The Farrell Law Firm, P.C.

(57) ABSTRACT

An apparatus and a method are provided that can intuitively and easily recognize hand rotation. The apparatus for recognizing a hand rotation includes a camera for photographing a plurality of hand image data, a detector for extracting circles through fingers of the hand image data and a controller for recognizing hand rotation through changes in positions and sizes of the circles extracted from each of the plurality of hand image data.

16 Claims, 8 Drawing Sheets

APPARATUS AND METHOD FOR RECOGNIZING HAND ROTATION

PRIORITY

This application claims priority under 35 U.S.C. §119(a) to a Korean Patent Application filed in the Korean Industrial Property Office on Jan. 24, 2011 and assigned Serial No. 10-2011-0006888, the contents of which are incorporated herein by reference.

BACKGROUND OF THE INVENTION

1. Field of the Invention

The present invention relates generally to an apparatus and method for hand image recognition, and more particularly, to an apparatus and method for recognizing hand rotation.

2. Description of the Related Art

In general, hand orientation detection is used in high-tech systems. When one desires to detect a position and an orientation of a hand in a three dimensional (3D) space, one has to detect the hand using a camera, a 3D range-finder, or any other device, which can detect the presence of the hand and provide some information on the position and orientation of the hand.

One of several methods that may be used to detect an orientation of a hand is through use of a camera. Other methods are based on an image histogram, a finger distinguished mark, or stereoscopic vision. However, the above methods have several disadvantages.

In the method based on the finger distinguished mark, all or most hand marks should be visible through a camera at all times. If the method requires detecting a fingertip, all fingers should be visible and should not be obscured by another object. Accordingly, the finger distinguished mark method is limited in that it is not easy to detect the presence of another object.

Additionally, although there exists several approaches to hand orientation detection, the methods are limited by requiring complex finger orientation recognition.

SUMMARY OF THE INVENTION

Accordingly, the present invention has been made to solve the above-stated problems occurring in the prior art, and the present invention provides an apparatus and a method for recognizing a hand rotation, which can intuitively and easily recognize the hand rotation.

In accordance with an aspect of the present invention, there is provided an apparatus for recognizing a hand rotation. The apparatus includes a camera for photographing a plurality of hand image data, a detector for extracting circles from fingers of the hand image data and a controller for controlling such that the hand rotation is recognized through changes in positions and sizes of the circles extracted from each of the plurality of hand image data.

In accordance with another aspect of the present invention, there is provided a method of recognizing a hand rotation. The method includes extracting circles from fingers of hand image data when a plurality of hand image data are received, and recognizing the hand rotation through changes in positions and sizes of the circles detected from each of the plurality of hand image data.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, a detailed explanation of known related functions and constituents are omitted to avoid unnecessarily obscuring the subject matter of the present invention.

Figure 1:
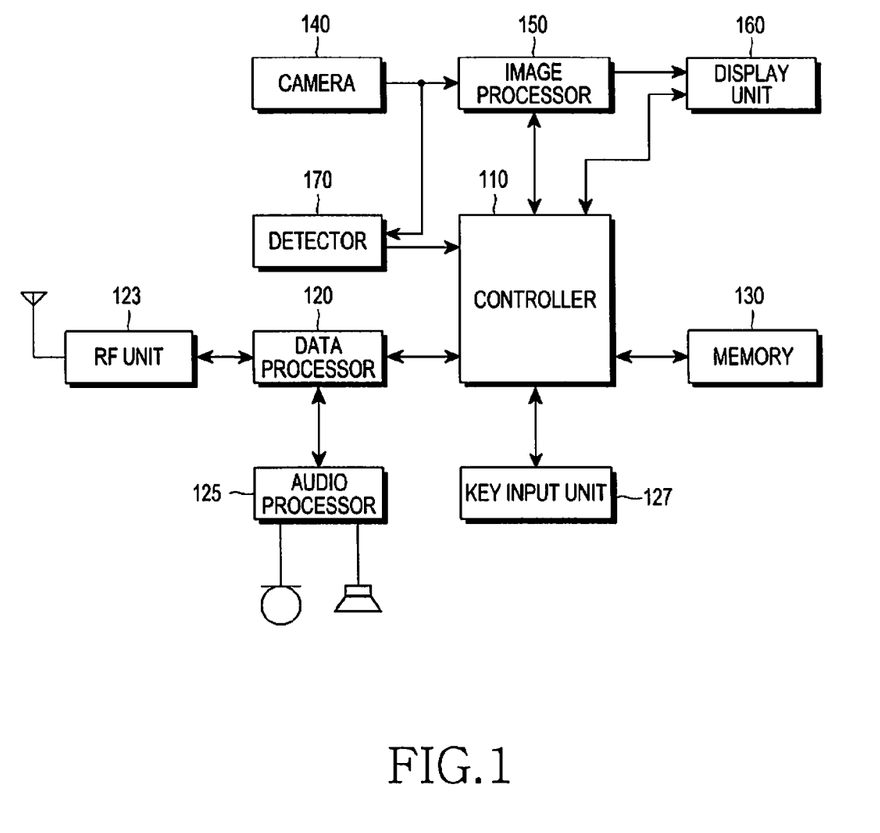
FIG. 1 illustrates a block diagram of a portable terminal according to an embodiment of the present invention.

FIG. 1 is block diagram of a portable terminal according to an embodiment of the present invention.

A Radio Frequency (RF) unit 123 performs a wireless communication function of the portable terminal. The RF unit 123 includes an RF transmitter for up-converting and amplifying a frequency of a transmitted signal, and an RF receiver for low noise-amplifying a received signal and down-converting a frequency. A data processor 120 includes a transmitter for encoding and modulating the transmitted signal, and a receiver for decoding and demodulating the received signal. That is, the data processor 120 includes a modem and a codec. Preferably, the codec includes a data codec for processing packet data and an audio codec for processing an audio signal such as a person's voice. An audio processor 125 reproduces a received audio signal output from the audio codec and transmits a transmission audio signal generated from a microphone to the audio codec of the data processor 120.

A key input unit 127 includes keys for inputting number information and character information and function keys for setting various functions.

A memory 130 includes at least a program memory and data memories. The program memory stores programs for controlling general operations of the portable terminal and programs for recognizing hand rotation by using circles extracted from bending of fingers in a plurality of hand image data, as described below.

According to an embodiment of the present invention, the memory 130 stores patterns according to changes in positions and sizes of the circles, which enable recognition of the hand rotation.

A controller 110 controls general operations of the portable terminal.

According to an embodiment of the present invention, the controller 110 inputs a plurality of image data sequentially received from a camera 140 to a detector 170. The plurality of image data include sequential rotation movements of the hand.

Further, when center values and radius values of the circles extracted from each of the plurality of image data through the detector 170 are received, the controller 110 determines changes in positions and sizes of the circles for the plurality of image data through the center values and the radius values of the circles for the respective image data.

When the changes in the positions and the sizes of the circles are generated in a pattern enabling a preset hand rotation to be recognized, the controller 110 recognizes the generation of the hand rotation.

According to an embodiment of the present invention, when a pattern, in which the positions of the circles are moved to an outside of the hand image from the center of the hand image and the sizes of the circles become smaller, is recognized in the plurality of sequential image data, the controller 110 recognizes the generation of the hand rotation.

As the hand rotates, the sizes of the circles become smaller, as defined by Equation (1) below:

$$\lim_{\varphi \to \frac{\pi}{2}} r(\varphi) = const$$
$$\lim_{\varphi \to 0} r(\varphi) = \infty$$

Equation (1)

In Equation (1), φ refers to an angle of hand rotation with respect to one axis, "lim" refers to a limit function, "const" refers to a constant, and r(φ) is an expression indicating a radius of a finger bend in a rotation function.

The detector 170 extracts hand image data from each of the plurality of image data received from the camera 140, and extracts an edge for the hand image data. Further, the detector 170 extracts circles from edges of fingers of the hand image data by using a Hough transform method, and detects center values and radius values of the circles for the respective image data to transmit the detected values to the controller 110.

The Hough transform method relates to image processing for detecting imperfect instances of objects in specific kinds of shapes, and is used to extract a line or a circle in an image.

The camera 140 photographs image data, and includes a camera sensor for converting a photographed optical signal to an electrical signal and a signal processor for converting an analog image signal photographed from the camera sensor to digital data. Preferably, the camera sensor is a Charge-Coupled Device (CCD) sensor or a Complementary Metal-Oxide Semiconductor (CMOS) sensor. The signal processor is preferably implemented by a Digital Signal Processor (DSP). Further, the camera sensor and the signal processor may be integrally implemented, or also may be separately implemented. In addition, the camera 140 photographs a plurality of hand image data including rotation movements of the hand according to embodiments of the present invention.

The image processor 150 performs Image Signal Processing (ISP) for displaying an image signal output from the camera 140 in a display unit 160, and the ISP includes functions such as gamma correction, interpolation, spatial variation, image effects, image scale, Auto White Balance (AWB), Auto Exposure (AE), Auto Focus (AF), etc. Accordingly, the image processor 150 processes the image signal output from the camera 140 frame by frame, and outputs the framed image data according to a characteristic and a size of the display unit 160. Further, the image processor 150 includes an image codec, and compresses the frame image data in a set form or restores the compressed frame image data to original frame image data. The image codec may be a JPEG codec, an MPEG4 codec, a Wavelet codec, etc. The image processor 150 has an On Screen Display (OSD) function, and the image processor 150 can output on screen display data according to a size of a screen displayed under control of the controller 110.

The display unit 160 displays an image signal output from the image processor 150 on a screen, and displays user data output from the controller 110. Preferably, the display unit 160 uses a Liquid Crystal Display (LCD). When using an LCD, the display unit 160 includes an LCD controller, a memory capable of storing image data, and an LCD display device. When the LCD is implemented as a touch screen, the display unit may be operated as an input unit. For the touch screen, keys such as the key input unit 127 are displayed in the display unit 160.

Figure 2:
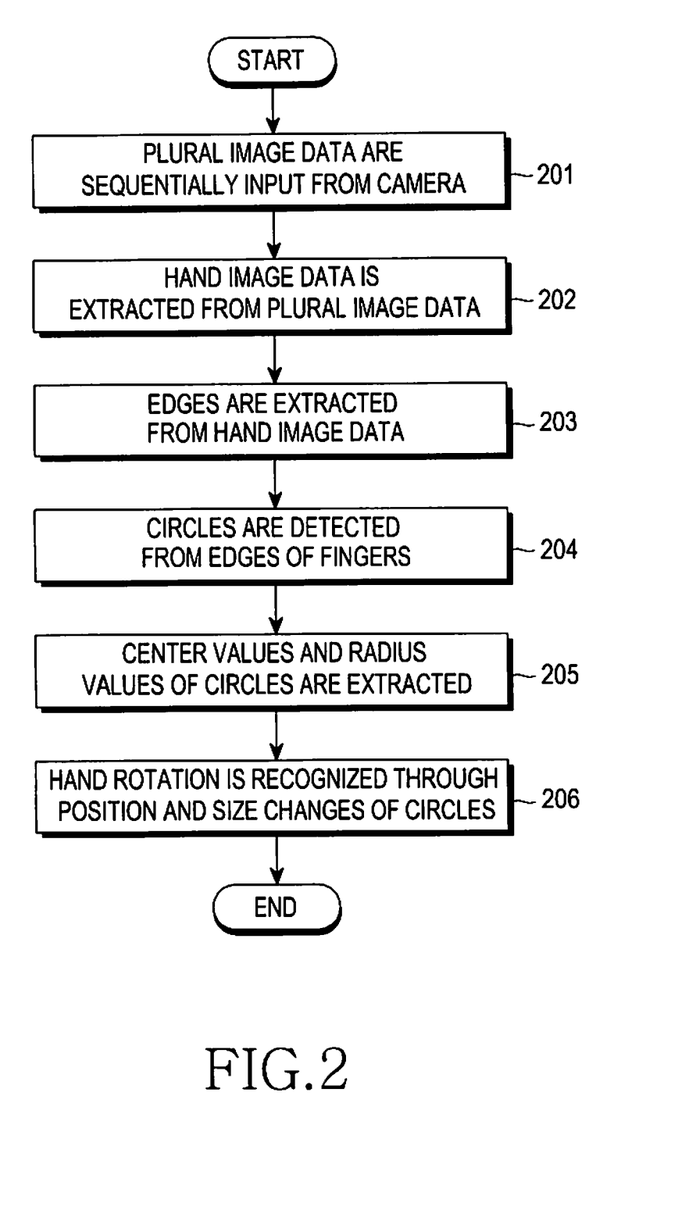
FIG. 2 is a flowchart illustrating a hand rotation recognition process in a portable terminal according to an embodiment of the present invention.

An operation for recognizing the hand rotation in the portable terminal as described above will be described in detail with reference to FIGS. 2 to 8. FIG. 2 is a flowchart illustrating a hand rotation recognition process in a portable terminal according to an embodiment of the present invention.

When a plurality of image data is sequentially input through the camera 140 in step 201, the controller 110 detects the input and transmits the plurality of image data to the detector 170.

The detector 170 extracts only hand image data from each of the plurality of sequentially input image data in step 202, and extracts an edge, i.e. an outline of the hand, for the hand image data in step 203.

Further, the detector 170 extracts circles from fingers of the hand image data by using the Hough transform method in step 204, and extracts center values and radius values of the extracted circles in step 205.

When the fingers are in a bended state, circles are extracted from the bending of the fingers by using the Hough transform method.

The detector 170 transmits the center values and the radius values of the circles for the plurality of image data extracted in steps 202 to 205 to the controller 110.

When the center values and the radius values of the circles for the plurality of image data are received from the detector 170, the controller 110 determines changes in positions and sizes of the circles through the center values and the radius values of the circles for each of the plurality of image data in step 206.

In step 206, the controller 110 detects position changes in which the circles move to an outside of the hand image from the center of the hand image. Further, when the controller 110 detects size changes in which sizes of the circles become smaller, the controller 110 detects that patterns of the generated position changes and size changes are patterns for hand rotation recognition and recognizes the generation of the hand rotation.

As indicated by Equation (1) above, the sizes of the circles become smaller as the hand rotates. The controller 110 receives a plurality of images from the camera, extracts a plurality of hand image data from the plurality of images, and extracts a plurality of circles (center values and radius values) from fingers of the hand image data. Therefore, the circle extracted from the first received hand image data is a biggest circle and the circle extracted from the last received hand image data is the smallest circle, according to the chronological order of the plurality of images received from the camera.

In order to implement the embodiments of the present invention described above, fingers of the rotating hand are not fully opened. In general, a hand of a person remains bent in a natural position.

FIGS. 3 to 8 illustrate image data for a hand rotation operation.

Figure 3:
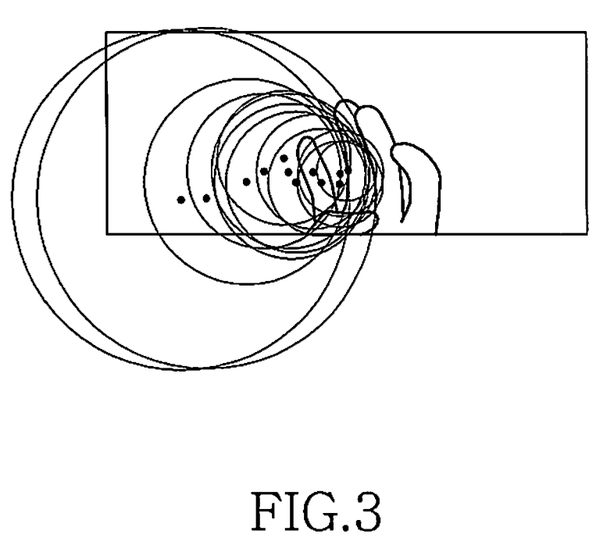
FIGS. 3 to 8 illustrate a hand rotation recognition process in a portable terminal according to embodiments of the present invention.

FIG. 3 illustrates a first hand image data of a person's hand of a plurality of image data, and illustrates circles extracted by using the Hough transform method.

Figure 4A:
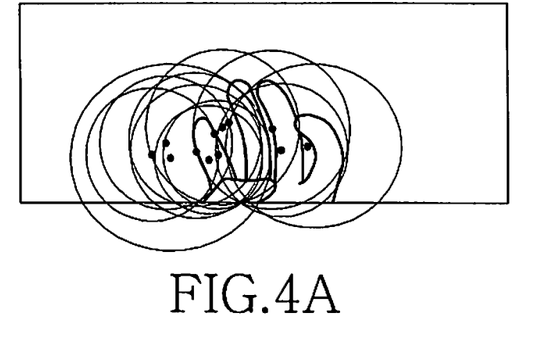
Figure 4B:
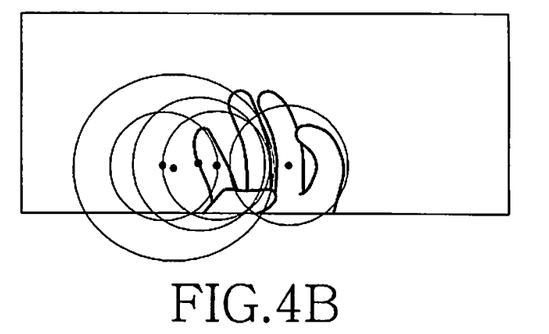
Figure 4C:
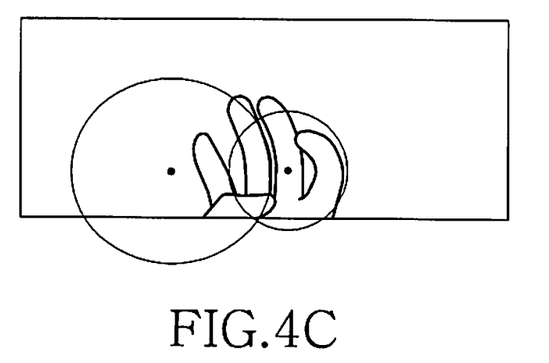

FIGS. 4A to 4C illustrate a second hand image data of a person's hand of the plurality of image data, and illustrate that the second hand image data, to which the Hough transform is applied according to a radius threshold value v, differently extracts circles.

The radius threshold values are values having a medium range between a minimum value and a maximum value of a plurality of radius threshold values v, and set through the Hough transform method.

FIGS. 4A to 4C also illustrate circles extracted from the second image data, respectively. In FIG. 4A, the radius threshold value v is set to a value larger than 17 (e.g. v≥17) In FIG. 4B, the radius threshold value v is set to a value larger than 18 (e.g. v≥18) In FIG. 4C, the radius threshold value v is set to a value larger than 19 (e.g. v≥19).

Figure 5A:
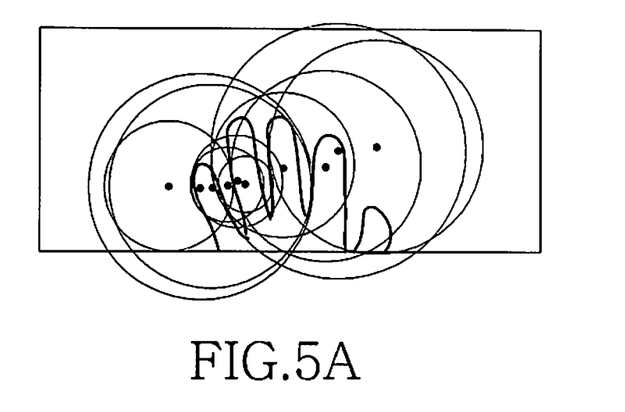
Figure 5B:
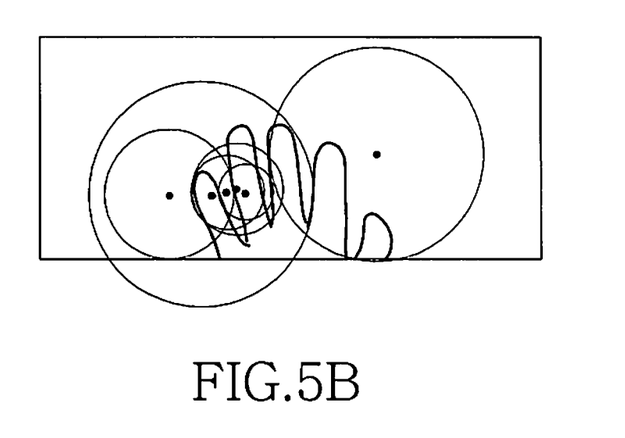

FIGS. 5A to 5B illustrate a third hand image data of a person's hand of the plurality of image data, and illustrate that the third hand image data, to which the Hough transform is applied according to the radius threshold value v, differently extracts circles.

FIGS. 5A to 5B illustrate circles extracted from the third image data, respectively. In FIG. 5A, the radius threshold value v is set to a value larger than 19 (e.g. v≥19). In FIG. 5B, the radius threshold value v is set to a value larger than 20 (e.g. v≥20).

Figure 6A:
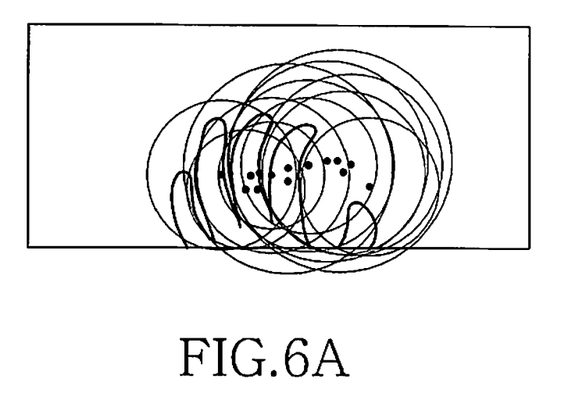
Figure 6B:
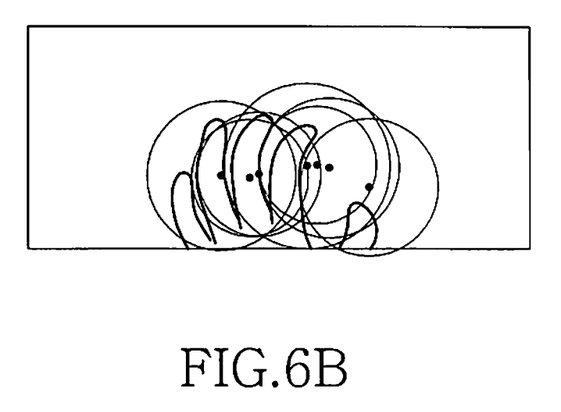

FIGS. 6A to 6B are a fourth hand image data of a person's hand of the plurality of image data, and illustrate that the fourth hand image data, to which the Hough transform is applied according to the radius threshold value v, differently extracts circles.

FIGS. 6A to 6B illustrate circles extracted from the fourth image data, respectively. In FIG. 6A, the radius threshold value v is set to a value larger than 18 (e.g. v≥18). In FIG. 6B, radius threshold value v is set to a value larger than 19 (e.g. v≥19).

Figure 7A:
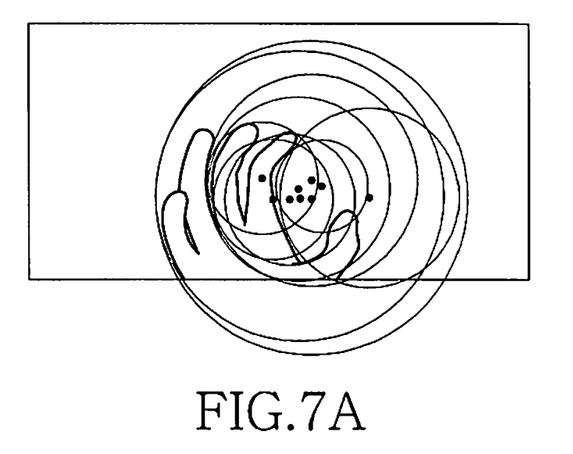
Figure 7B:
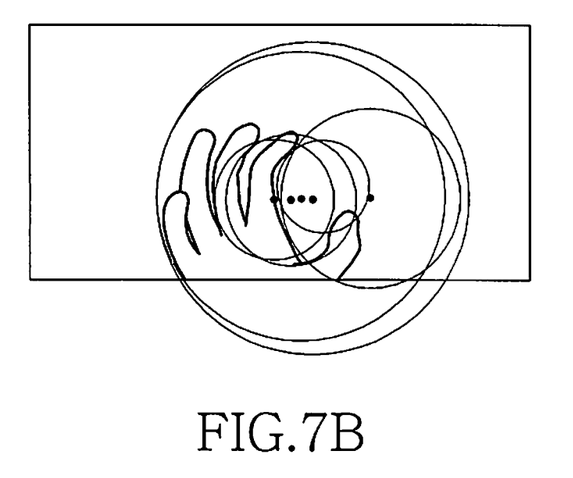

FIGS. 7A to 7B are a fifth hand image data of a person's hand of the plurality of image data, and illustrate that the fifth hand image data, to which the Hough transform is applied according to the radius threshold value v, differently extracts circles.

FIGS. 7A to 7B illustrate circles extracted from the fifth image data, respectively. In FIG. 7A, the radius threshold value v is set to a value larger than 19 (e.g. v≥19). In FIG. 7B, the radius threshold value v is set to a value larger than 20 (e.g. v≥20).

Figure 8A:
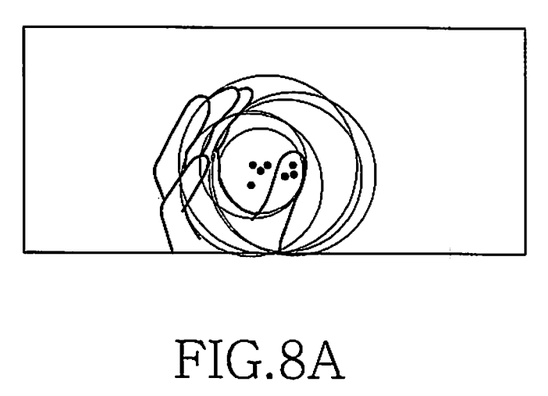
Figure 8B:
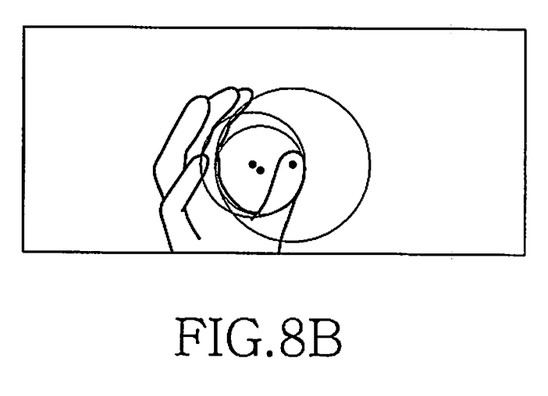

FIGS. 8A to 8B are a sixth hand image data of a person's hand of the plurality of image data, and illustrate that the sixth hand image data, to which the Hough transform is applied according to the radius threshold value v, differently extracts circles.

FIGS. 8A to 8B illustrate circles extracted from the sixth image data, respectively. In FIG. 8A, the radius threshold value v is set to a value larger than 15 (e.g. v≥15). In FIG. 8B, the radius threshold value v is set to a value larger than 16 (e.g. v≥16).

As illustrated by FIGS. 3 to 8, centers of the circles, that is, positions of the circles, move to an outside of the hand image from the center of the hand image during the hand rotation and sizes of the circles become smaller as radii of the circles become smaller.

Accordingly, the hand rotation is recognized through position changes of the circles according to movements of center values of the circles and size changes of the circles according to changes of radius values of the circles.

While the present invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for recognizing hand rotation, the apparatus comprising:
    a camera for photographing a plurality of hand image data;
    a detector for extracting circles from fingers of the hand image data; and
    a controller for recognizing the hand rotation through changes in positions and sizes of the circles extracted from each of the plurality of hand image data.

2. The apparatus as claimed in claim 1, wherein the fingers from which the circles are extracted are in a bent state.

3. The apparatus as claimed in claim 1, wherein the plurality of hand image data photographed through the camera comprise sequential hand rotation movements.

4. The apparatus as claimed in claim 1, wherein the detector extracts edges of the hand image data, extracts circles from the edges of the fingers of the hand image data, and detects center values and radius values of the extracted circles.

5. The apparatus as claimed in claim 1, wherein the detector extracts circles from the fingers by using a Hough transform method.

6. The apparatus as claimed in claim 1, wherein the controller receives center values and radius values of the circles for each of the plurality of hand image data from the detector, detects position changes of the circles from a center of a hand through the center values of the circles, detects size changes of the circles through the radius values of the circles, and recognizes the hand rotation when the detected position changes and size changes of the circles correspond to patterns enabling the hand rotation to be recognized.

7. The apparatus as claimed in claim 6, wherein, when the patterns in which positions of the circles are moved to an outside of the center of the hand image and sizes of the circles become smaller are generated, the controller recognizes the hand rotation.

8. The apparatus as claimed in claim 7, wherein Equation 1 the sizes of the circles are determined as becoming smaller when the hand rotates, according to:

$$\lim_{\varphi \to \frac{\pi}{2}} r(\varphi) = const$$

$$\lim_{\varphi \to 0} r(\varphi) = \infty,$$

wherein φ refers to the hand rotation with respect to one axis and r(φ) refers to a radius of a finger bend in a rotation function.

9. A method of recognizing a hand rotation, the method comprising:
    extracting circles from fingers of a plurality of hand image data when the plurality of hand image data are received; and
    recognizing the hand rotation through changes in positions and sizes of the circles detected from each of the plurality of hand image data.

10. The method claimed in claim 9, wherein the fingers from which the circles are extracted are in a bent state.

11. The method claimed in claim 9, wherein the plurality of hand image data photographed through a camera comprise sequential hand rotation movements.

12. The method as claimed in claim 9, wherein extracting the circles comprises:
    extracting edges for the plurality of hand image data;
    extracting circles from the edges of the fingers of the plurality of hand image data; and detecting center values and radius values of the extracted circles.

13. The method as claimed in claim 9, wherein circles are extracted from the fingers by using a Hough transform method.

14. The method as claimed in claim 9, wherein recognizing the hand rotation comprises:
   detecting position changes of the circles from a hand through center values of the extracted circles;
   detecting size changes of the circles through radius values of the extracted circles; and
   recognizing the hand rotation when the position changes and the size changes of the circles for the plurality of hand image data correspond to patterns for a hand rotation recognition.

15. The method as claimed in claim 14, wherein, the hand rotation is recognized when patterns in which positions of the circles are moved to an outside of a center of the hand image and sizes of the circles become smaller are generated.

16. The method as claimed in claim 15, wherein the sizes of the circles are determined as becoming smaller when the hand rotates, according to:

$$\lim_{\varphi \to \frac{\pi}{2}} r(\varphi) = const$$

$$\lim_{\varphi \to 0} r(\varphi) = \infty,$$

wherein $\phi$ refers to the hand rotation with respect to one axis and $r(\phi)$ refers to a radius of a finger bend in a rotation function.

* * * * *